US 11,444,515 B2

(12) United States Patent
Fukuda et al.

(10) Patent No.: US 11,444,515 B2
(45) Date of Patent: Sep. 13, 2022

(54) MOUNTING STRUCTURE OF ROTATING MEMBER OF ENCODER AND METHOD OF MOUNTING ROTATING MEMBER OF ENCODER

(71) Applicant: FANUC CORPORATION, Yamanashi (JP)

(72) Inventors: Masao Fukuda, Yamanashi-ken (JP); Nobuyuki Ootake, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 375 days.

(21) Appl. No.: 16/560,114

(22) Filed: Sep. 4, 2019

(65) Prior Publication Data
US 2020/0083784 A1    Mar. 12, 2020

(30) Foreign Application Priority Data
Sep. 6, 2018 (JP) .............................. JP2018-166487

(51) Int. Cl.
*H02K 11/215* (2016.01)
*G01D 5/245* (2006.01)
(Continued)

(52) U.S. Cl.
CPC ............ *H02K 11/22* (2016.01); *G01D 5/2451* (2013.01); *G01D 5/34792* (2013.01); *H02K 11/215* (2016.01)

(58) Field of Classification Search
CPC ...... H02K 11/215; H02K 29/10; H02K 11/22; H02K 11/21; G01D 5/2451; G01D 5/24442; G01D 5/3473; G01D 5/34792
(Continued)

(56) References Cited

U.S. PATENT DOCUMENTS 3,894,232 A * 7/1975 Laspesa ............. G01D 5/34715
250/234
5,049,737 A * 9/1991 Kloppenburg ............. B41J 1/24
250/237 G
(Continued)

FOREIGN PATENT DOCUMENTS

JP    H08278165 A    10/1996
JP    2000196449 A    7/2000
(Continued)

OTHER PUBLICATIONS

English Abstract and Machine Translation for Japanese Publication No. JPH08-278165A, published Oct. 22, 1996, 9 pgs.
(Continued)

*Primary Examiner* — John K Kim
(74) *Attorney, Agent, or Firm* — Fredrikson & Byron, P.A.

(57) ABSTRACT

A mounting structure of a rotating member of an encoder for detecting a phase angle of a magnet provided on a rotor of a motor includes: a rotating shaft configured to be rotated by driving of the motor; the rotating member on which a phase angle detection pattern configured to detect the phase angle is formed; and a boss attached to the rotating member and configured to mount the rotating member to an end of the rotating shaft. In this configuration, the end of the rotating shaft and the boss are provided with a first positioning structure configured to position a mounting position of the boss relative to the rotating shaft about the axis of the rotating shaft.

6 Claims, 7 Drawing Sheets

(51) Int. Cl.
*H02K 11/22* (2016.01)
*G01D 5/347* (2006.01)

(58) Field of Classification Search
USPC ................................................ 310/68 B
See application file for complete search history.

(56) References Cited

U.S. PATENT DOCUMENTS

| | | | | |
|---|---|---|---|---|
| 6,624,407 | B1* | 9/2003 | Aboonasry | G01D 5/34738 |
| | | | | 356/616 |
| 7,026,734 | B2* | 4/2006 | Braun | G01D 5/34707 |
| | | | | 310/68 B |
| 7,737,592 | B2* | 6/2010 | Makino | H02K 3/522 |
| | | | | 310/156.53 |
| 8,823,232 | B2* | 9/2014 | Terashita | H02K 5/04 |
| | | | | 310/90 |
| 8,860,261 | B2* | 10/2014 | Makino | H02K 41/03 |
| | | | | 310/12.14 |
| 2002/0145351 | A1* | 10/2002 | Horng | H02K 29/08 |
| | | | | 310/114 |
| 2008/0001106 | A1* | 1/2008 | Igarashi | G01D 11/30 |
| | | | | 250/566 |
| 2008/0197729 | A1* | 8/2008 | Igarashi | H02K 11/22 |
| | | | | 310/68 B |
| 2008/0258585 | A1* | 10/2008 | Kataoka | H02K 11/225 |
| | | | | 310/68 B |
| 2010/0303662 | A1* | 12/2010 | Liu | F04C 18/16 |
| | | | | 418/201.1 |
| 2013/0106252 | A1* | 5/2013 | Yanagida | H02K 11/225 |
| | | | | 310/68 B |
| 2014/0035444 | A1* | 2/2014 | Jung | H02K 11/215 |
| | | | | 310/68 B |
| 2014/0184030 | A1* | 7/2014 | Labriola, II | G01D 5/2451 |
| | | | | 310/68 B |
| 2015/0211897 | A1* | 7/2015 | Yap | G01D 5/34707 |
| | | | | 250/231.13 |
| 2015/0303775 | A1* | 10/2015 | Shim | H02K 11/225 |
| | | | | 310/68 B |
| 2015/0318755 | A1* | 11/2015 | Bonnici | H02K 5/15 |
| | | | | 310/90 |
| 2016/0003646 | A1* | 1/2016 | Yoshida | G01D 5/34784 |
| | | | | 310/68 B |
| 2020/0083784 | A1* | 3/2020 | Fukuda | H02K 11/22 |

FOREIGN PATENT DOCUMENTS

| | | |
|---|---|---|
| JP | 2001227990 A | 8/2001 |
| JP | 2003315103 A | 11/2003 |
| JP | 2004144548 A | 5/2004 |
| JP | 2013240251 A | 11/2013 |
| JP | 2014137266 A | 7/2014 |
| JP | 2015105839 A | 6/2015 |
| JP | 201891739 A | 6/2018 |
| WO | 2010119513 A1 | 10/2010 |

OTHER PUBLICATIONS

English Abstract and Machine Translation for Japanese Publication No. JP2000-196449A, published Jul. 14, 2000, 5 pgs.
English Abstract and Machine Translation for Japanese Publication No. JP2001-227990A, published Aug. 24, 2001, 8 pgs.
English Abstract and Machine Translation for Japanese Publication No. JP2003-315103A, published Nov. 6, 2003, 10 pgs.
English Abstract and Machine Translation for Japanese Publication No. JP2004-144548A, published May 20, 2004, 6 pgs.
English Abstract and Machine Translation for International Publication No. WO2010/119513A1, published Oct. 21, 2010, 5 pgs.
English Abstract and Machine Translation for Japanese Publication No. JP2013-240251A, published Nov. 28, 2013, 13 pgs.
English Abstract and Machine Translation for Japanese Publication No. JP2014-137266A, published Jul. 28, 2014, 12 pgs.
English Abstract and Machine Translation for Japanese Publication No. 2018-091739 A, published Jun. 14, 2018, 13 pgs.
English Abstract and Machine Translation for Japanese Publication No. JP2015-105839A, published Jun. 8, 2015, 9 pgs.

* cited by examiner

MOUNTING STRUCTURE OF ROTATING MEMBER OF ENCODER AND METHOD OF MOUNTING ROTATING MEMBER OF ENCODER

CROSS-REFERENCE TO RELATED APPLICATION

This application is based upon and claims the benefit of priority from Japanese Patent Application No. 2018-166487 filed on Sep. 6, 2018, the contents of which are incorporated herein by reference.

BACKGROUND OF THE INVENTION

Field of the Invention

The present invention relates to a mounting structure of a rotating member of an encoder for detecting a phase angle of magnets provided on a rotor of a motor and a mounting method of the rotating member of the encoder.

Description of the Related Art

Japanese Laid-Open Patent Publication No. 2018-091739 discloses a rotary encoder (encoder) in which a rotating plate (rotating member) is attached to a rotating shaft.

SUMMARY OF THE INVENTION

In Japanese Laid-Open Patent Publication No. 2018-091739, when the rotating plate is mounted to the rotating shaft, the phase angle of the magnets provided on the rotor of the motor and the phase angle of the pattern formed on the rotating plate for detecting the phase angle of the magnets need to be adjusted in position in a predetermined phase relationship, which takes time and effort in the mounting.

It is therefore an object of the present invention to provide a mounting structure of a rotating member of an encoder as well as a mounting method of the rotating member of the encoder, which enables mounting of the rotating member to a rotating shaft in such a manner the phase angle of magnets and the phase angle of the pattern formed on a rotating plate of the encoder can be adjusted in position in a predetermined phase relationship.

A first aspect of the invention resides in a mounting structure of a rotating member of an encoder for detecting a phase angle of a magnet provided on a rotor of a motor, which includes: a rotating shaft configured to be rotated by driving of the motor; the rotating member on which a phase angle detection pattern configured to detect the phase angle is formed; and a boss attached to the rotating member and configured to mount the rotating member to an end of the rotating shaft. In this configuration, the end of the rotating shaft and the boss are provided with a first positioning structure configured to position the mounting position of the boss relative to the rotating shaft about the axis of the rotating shaft.

A second aspect of the invention resides in a method of mounting a rotating member of an encoder for detecting a phase angle of a magnet provided on a rotor of a motor, in which: the encoder includes the rotating member on which a phase angle detection pattern for detecting the phase angle is formed, and a boss attached to the rotating member and configured to mount the rotating member to an end of the rotating shaft that is rotated by driving of the motor; the rotating shaft includes, formed at an end thereof, a cut-out cylindrical portion having a cut surface formed by cutting a cylindrical member along a plane parallel to the rotating shaft; and the boss includes a boss hole into which the cut-out cylindrical portion is inserted, and a screw hole extending from the outer peripheral surface of the boss to the boss hole so as to communicate with the boss hole, and the method includes: a step of inserting the cut-out cylindrical portion into the boss hole; and a step of fixing the rotating member to the rotating shaft by screwing a screw into the screw hole so as to press the cut surface with the screw.

According to the present invention, the rotating member can be easily mounted to the rotating shaft so that the phase angle of the magnet and the phase angle of the phase angle detection pattern formed on the rotating member are set in a predetermined phase state.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A mounting structure of a rotating member of an encoder and a mounting method of the rotating member of the encoder according to the present invention will be detailed below by describing a preferred embodiment with reference to the accompanying drawings.

Embodiment

Figure 1:
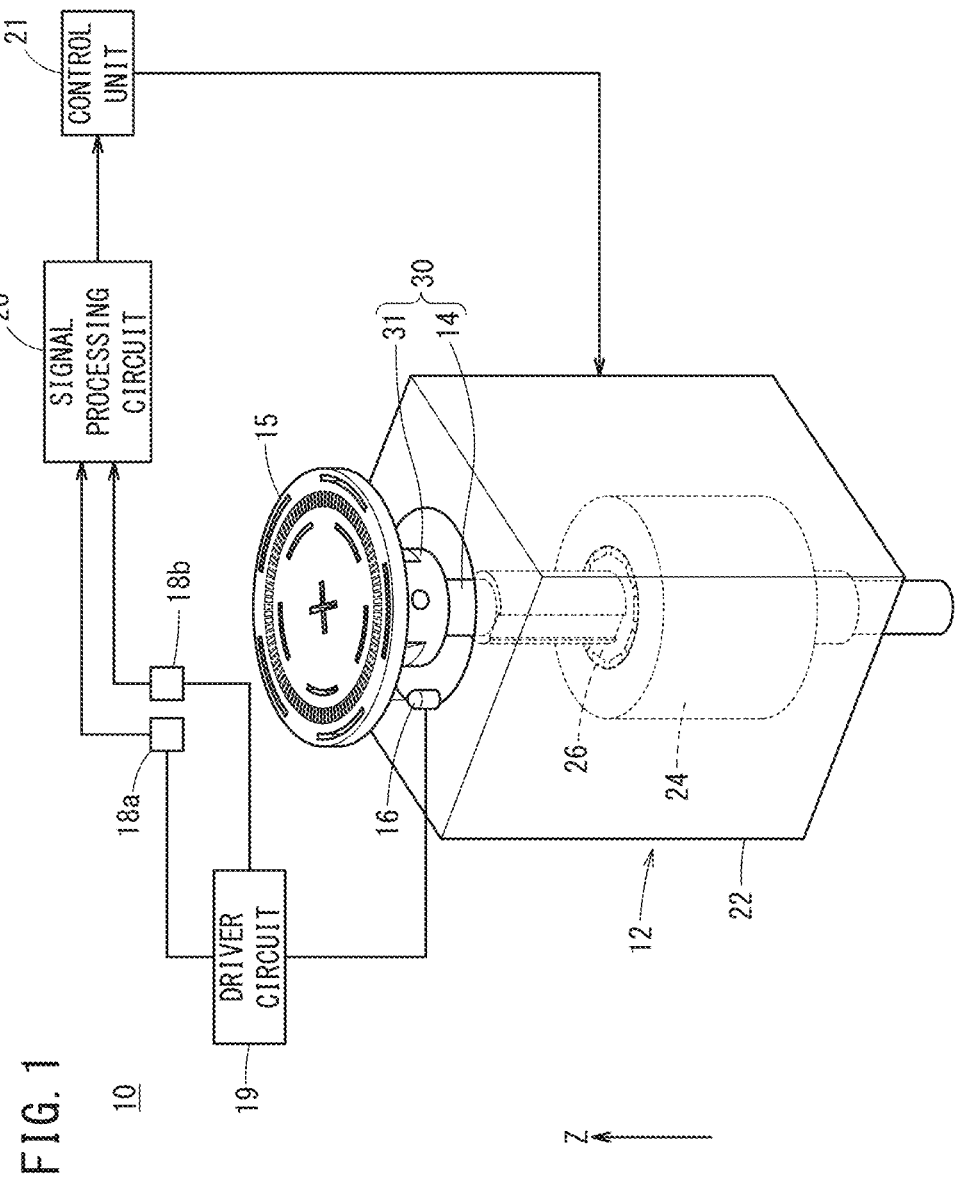
FIG. 1 is a diagram showing an example of a schematic configuration of an encoder according to an embodiment of the present invention.

FIG. 1 is a diagram showing an example of a schematic configuration of an encoder 10. The encoder 10 detects the rotation angle of a motor shaft (rotating shaft) 14 of a motor 12 (e.g., a servomotor).

In the present embodiment, the encoder 10 detects the rotation angle of the motor shaft 14 of the motor 12. However, the detection target is not limited to the motor shaft 14 as long as it is a rotating shaft that is rotated by driving of the motor 12. The rotating shaft rotated by driving of the motor 12 includes, for example, a rotating shaft that rotates via a power transmission mechanism (gear or pulley and belt) connected to the motor shaft 14 of the motor 12.

The motor 12 includes a motor case 22, a stator 24, and a rotor 26, in addition to the motor shaft 14. The stator 24 has a coil and is fixed to the inner peripheral surface of the motor case 22. The rotor 26 includes a plurality of magnets (permanent magnets) 29 (see FIG. 4), and is disposed on the inner peripheral side of the stator 24 in the motor case 22. The plurality of magnets 29 are arranged at regular intervals in the circumferential direction on the outer peripheral surface of a holding member 27 (see FIG. 4). The motor shaft 14 is fixed to the rotor 26 in a state of being inserted in the rotor 26. The motor shaft 14 is rotatably supported via a bearing (not shown) provided in the motor case 22. When the coil of the stator 24 is energized, the motor shaft 14 and the rotor 26 rotate together relative to the stator 24. Both ends of the motor shaft 14 project from the motor case 22. The description hereinbelow will be given assuming that the axis of the motor shaft 14 lies on the Z-axis direction, as shown in FIG. 1 and others. The arrow shown in FIG. 1 indicates the positive Z-direction, and the direction opposite to the arrow is negative Z-direction.

The encoder 10 includes a rotating member 15, an illuminating unit 16, two light receiving units 18 (18a and 18b), a driver circuit 19, a signal processing circuit 20, and a control unit 21.

The rotating member 15 is provided on one end side (positive Z-direction side) of the motor shaft 14 with a boss 31 in-between and rotates together with the motor shaft 14. The rotating member 15 is made of, for example, a disk-shaped member with light blocking property.

Figure 2:
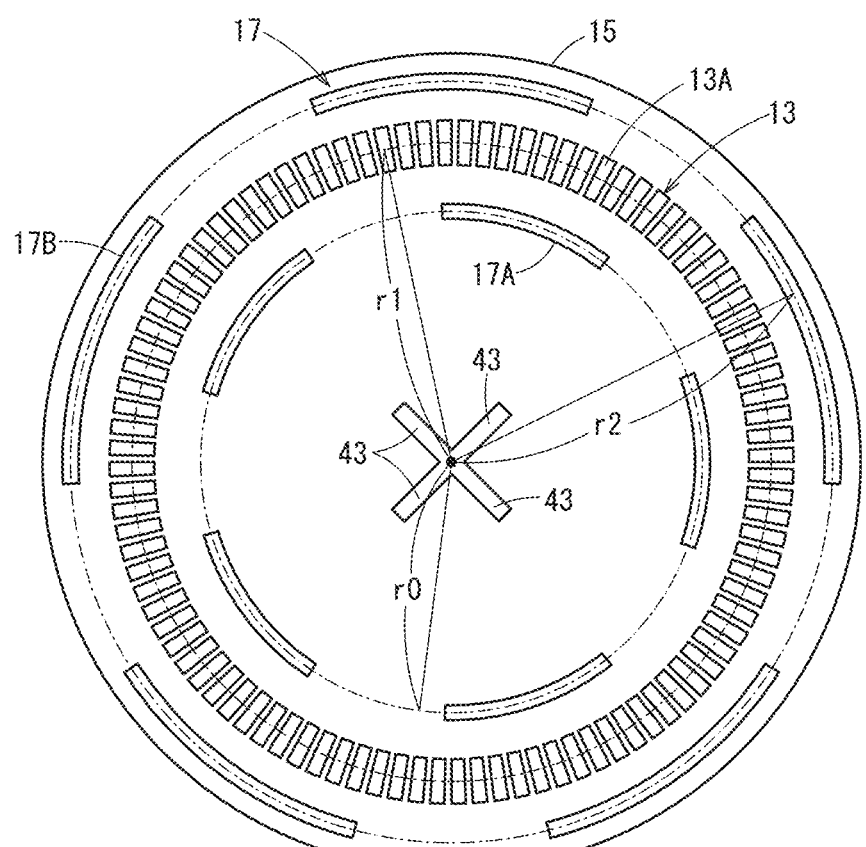
FIG. 2 is a plan view of a rotating member of an encoder of the embodiment.

As shown in FIG. 2, the rotating member 15 has, formed thereon, a rotation angle detection pattern 13 for detecting the rotation angle of the motor shaft 14. The rotation angle detection pattern 13 is formed on the outer peripheral part of the rotating member 15. The rotation angle detection pattern 13 includes a plurality of slits 13A arranged at regular intervals around the axis of the motor shaft 14 (around the Z-axis) and extending in the radial direction of the rotating member 15. These slits 13A are arranged on a circle centered at the Z-axis with a radius r1.

The rotating member 15 further has, formed thereon, a phase angle detection pattern 17 for detecting the phase angle of the magnets 29. The phase angle detection pattern 17 is formed of plural (five in FIG. 2) slits 17A and plural (five in FIG. 2) slits 17B, each group of slits being arranged at regular intervals around the axis of the motor shaft 14 (around the Z-axis) and extending in the circumferential direction of the rotating member 15. The multiple slits 17A are arranged on a circle centered at the Z-axis with a radius r0 smaller than r1 while the multiple slits 17B are arranged on a circle centered at the Z-axis with a radius r2 greater than r1.

The illuminating unit 16 includes a light emitting element, such as LED. The illuminating unit 16 is arranged on the negative Z-direction side with respect to the rotating member 15. The two light receiving units 18 (18a, 18b) each include a light receiving element such as a photodiode. The two light receiving units 18 (18a, 18b) are provided on the positive Z-direction side with respect to the rotating member 15.

The light emitted from the illuminating unit 16 passes through the rotation angle detection pattern 13 and the phase angle detection pattern 17, and then enters the two light receiving units 18 (18a, 18b). The light receiving unit 18a receives the light having passed through the rotation angle detection pattern 13 and outputs a signal obtained by the light reception, to the signal processing circuit 20. The light receiving unit 18b receives the light having passed through the phase angle detection pattern 17 and outputs a signal obtained by the light reception, to the signal processing circuit 20.

The driver circuit 19 drives the illuminating unit 16 and the light receiving units 18. The driver circuit 19 causes the illuminating unit 16 to emit light constantly during the detecting operation of the encoder 10.

The signal processing circuit 20 detects the rotation angle of the motor shaft 14 based on the signal from the light receiving unit 18a. The signal processing circuit 20 detects the phase angle of the magnets 29 based on the signal from the light receiving unit 18b.

The control unit 21 controls the motor 12 based on the rotation angle of the motor shaft 14 and the phase angle of the magnets 29 from the signal processing circuit 20.

Figure 3:
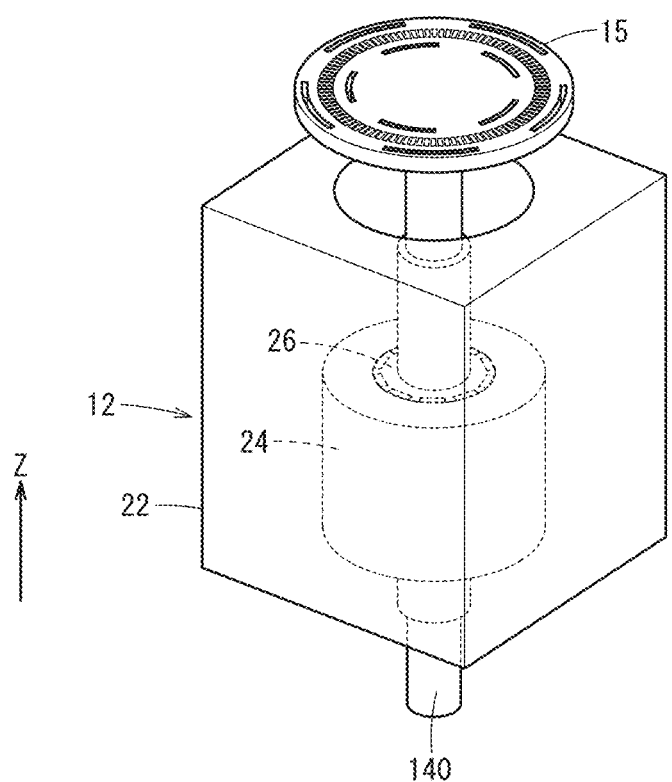
FIG. 3 is a view of a comparative example showing a state in which a rotating member is attached to a motor shaft by an adhesive.

Here, in the comparative example shown in FIG. 3, when the rotating member 15 is attached to a motor shaft 140, the rotating member 15 is directly bonded and fixed to one end (the positive Z-direction side end) of the motor shaft 140. Upon this attachment, it is necessary to attach the rotating member 15 to one end side of the motor shaft 140 so as to be in phase with the phase angle of the magnets 29 (see FIG. 4) of the rotor 26. That is, the rotating member 15 needs to be positioned relative to the motor shaft 140 such that the phase angle of the magnets 29 of the rotor 26 and the phase angle of the phase angle detection pattern 17 (see FIG. 2) are arranged in a predetermined phase state. For this reason, it takes time and effort to attach the rotating member 15 to the motor shaft 140.

For addressing the above situation, the inventors of the present invention have proposed a mounting structure of the rotating member 15 of the encoder 10, which enables easy attachment of the rotating member 15 to the motor shaft 14.

Next, the mounting structure of the rotating member 15 will be described.

Figure 4:
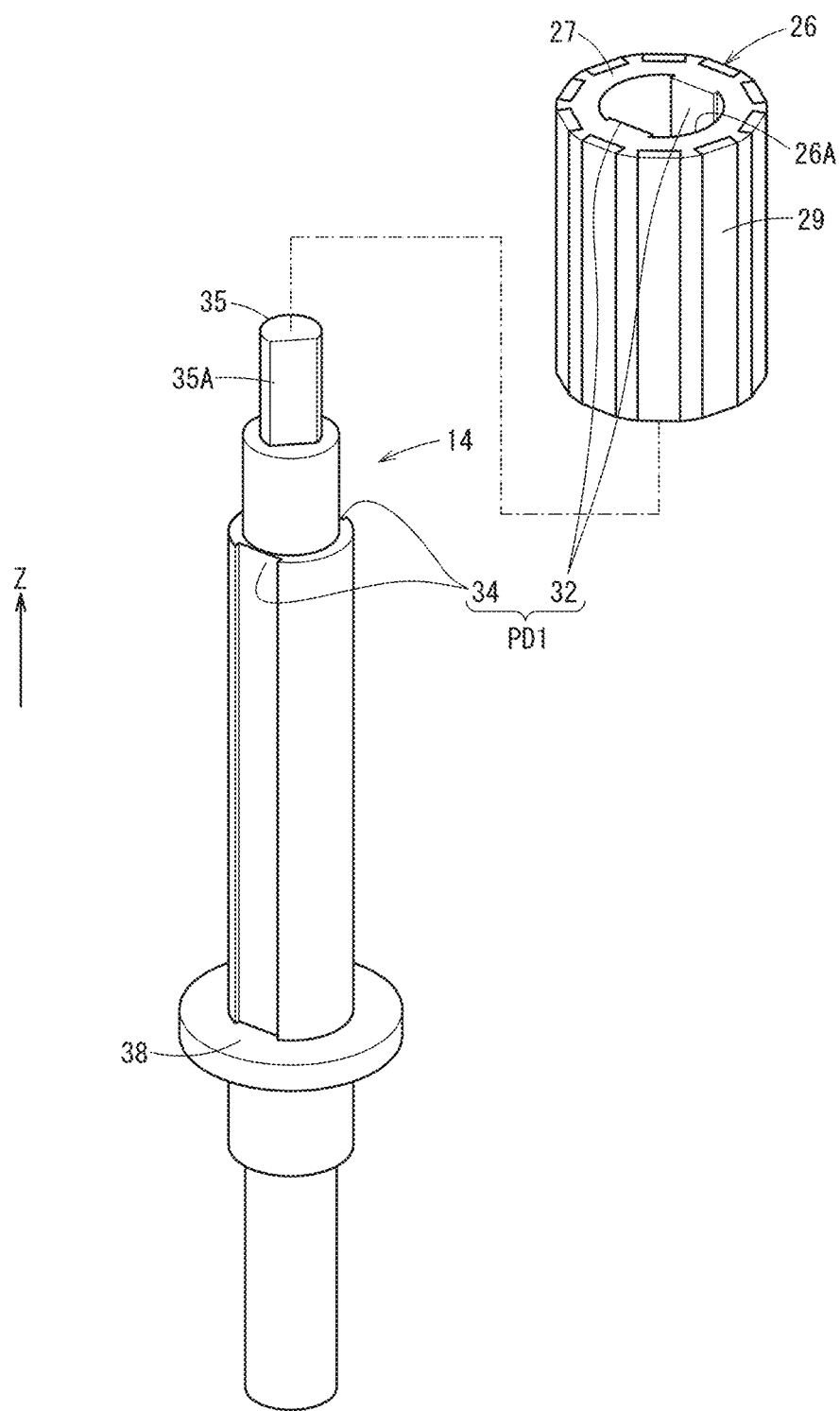
FIG. 4 is a perspective view showing a motor shaft and a rotor of the embodiment.

As shown in FIG. 4, the rotor 26 has, formed therein, an insertion hole 26A through which the motor shaft 14 is inserted. Two keys 32 radially projecting inwards or toward the center of the rotor 26 are formed on the inner wall surface defining the insertion hole 26A. The two keys 32 extend in the axial direction of the rotor 26 and are arranged to face each other.

Two key slots 34 extending in the axial direction of the motor shaft 14 are formed on the outer peripheral surface of the motor shaft 14 so as to engage with the two keys 32. Therefore, when the motor shaft 14 is attached to the rotor 26, at least one of the rotor 26 and the motor shaft 14 is rotated about the axis of the motor shaft 14 such that the two keys 32 are fitted into the two key slots 34. Then, the motor shaft 14 is inserted from the negative Z-side of the rotor 26 into the insertion hole 26A. With this configuration, the phase angle of the magnets 29 of the rotor 26 and the phase angle of the motor shaft 14 can be set in a predetermined phase state. The keys 32 and the key slots 34 constitute a positioning structure PD1 for positioning the relative mounting position of the motor shaft 14 relative to the rotor 26 about the axis of the motor shaft 14. The motor shaft 14 is provided with a stopper 38 which restricts a further movement of the inserted rotor 26 in the negative Z-direction. The stopper 38 is provided on the negative Z-side of a portion of the motor shaft 14 where the key slots 34 are formed.

The motor shaft 14 has a cut-out cylindrical portion 35 on the positive Z-direction side end. The cut-out cylindrical portion 35 has a cut surface 35A formed by cutting the cylindrical part by a plane parallel to the axial direction (Z-axis direction) of the motor shaft 14. The diameter of the cut-out cylindrical portion 35 is smaller than the diameter of the portion of the motor shaft 14 where the key slots 34 are formed. Therefore, the motor shaft 14 can be inserted into the insertion hole 26A of the rotor 26 from the side of the cut-out cylindrical portion 35.

Figure 5:
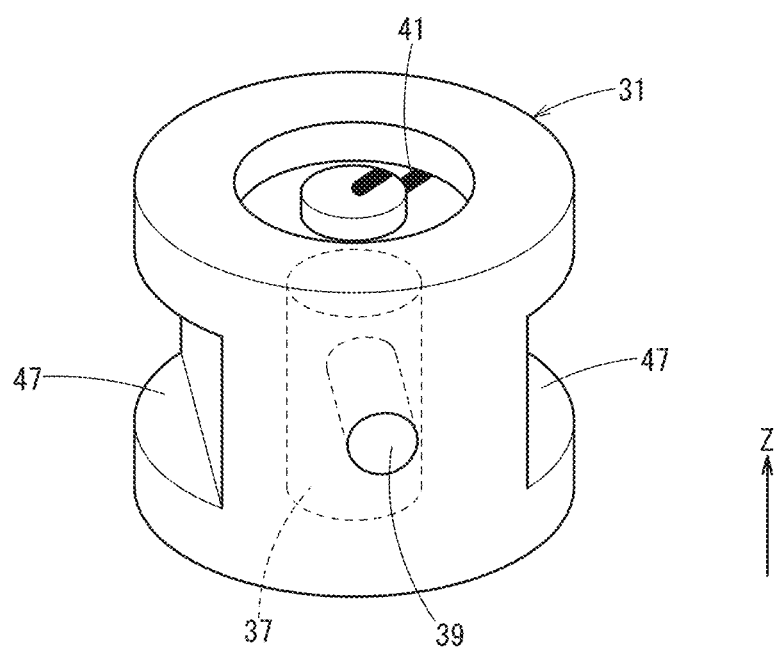
FIG. 5 is a perspective view showing a boss of the embodiment.

As shown in FIG. 5, the boss 31 is formed of a substantially cylindrical member with its axis in the Z-axis direction. The boss 31 is used for attaching the rotating member 15 to the positive Z-side end of the motor shaft 14. The boss 31 has a boss hole 37 into which the cut-out cylindrical portion 35 of the motor shaft 14 is inserted so as to accommodate therein at least part of the cut-out cylindrical portion 35, and a screw hole 39 extending from the outer peripheral side of the boss 31 to the boss hole 37 so as to communicate with the boss hole. A screw 45 (see FIG. 7B) for fixing the boss 31 to the motor shaft 14 is screw-engaged into this screw hole 39.

The boss 31 is provided with a position adjustment mark 41 for positioning the mounting position of the rotating member 15 relative to the boss 31 about the axis (about the Z-axis) of the motor shaft 14. The position adjustment mark 41 is a linear mark which is formed on one endface of the boss 31 (on the positive Z-direction side) and extends in the radial direction of the boss 31. The position adjustment mark 41 is an identifiable mark that is projected or recessed (grooved) relative to the other part on the positive Z-direction side of the boss 31 or colored with a different color from the other part so as to be identified or visually recognized.

The boss 31 has, formed on an outer peripheral surface thereof, two gripping grooves 47 for allowing a robot or the like to hold the boss 31. The screw hole 39 is formed between the two gripping grooves 47.

As shown in FIG. 2, the rotating member 15 is provided with position adjustment marks 43 for positioning the mounting position of the rotating member 15 relative to the boss 31 about the axis (about the Z-axis) of the motor shaft 14. Each of the position adjustment marks 43 is, for example, a slit extending radially outward on the rotating member 15 from the center of the rotating member 15 in plan view (as viewed in the Z-axis direction). In the present embodiment, a plurality of position adjustment marks 43 are provided. Therefore, the multiple position adjustment marks 43 are provided on the rotating member 15 radially outward from the center of the rotating member 15 in a radial fashion. In the present embodiment, since the number of the position adjustment marks 43 is four, the four position adjustment marks 43 are provided on the rotating member 15 so as to form a plus sign. The number of position adjustment marks 43 is determined based on the phase angle detection pattern 17.

Figure 6:
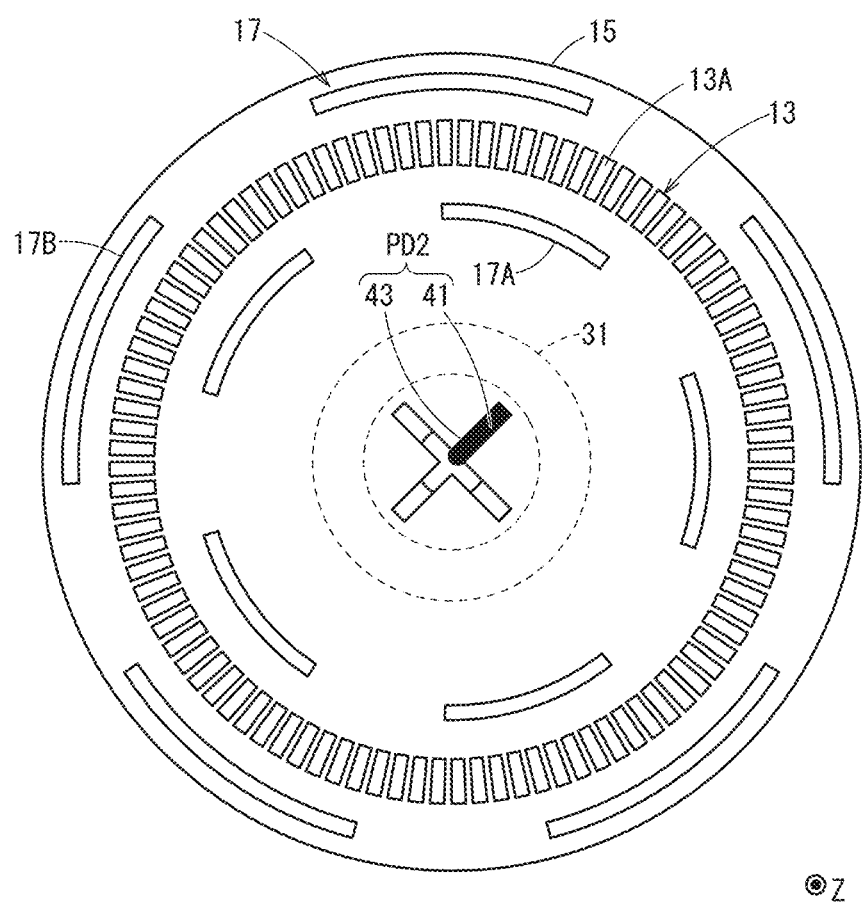
FIG. 6 is a view showing a state in which a position adjustment mark of a rotating member and a position adjustment mark of the boss are matched.

The rotating member 15 is attached to the positive Z-direction side end of the boss 31 by an adhesive or the like. At this time, the rotating member 15 is bonded to the positive Z-direction side end of the boss 31 by an adhesive or the like as shown in FIG. 6 so that the position adjustment mark 41 of the boss 31 is aligned with one of the multiple position adjustment marks 43 of the rotating member 15. Therefore, the phase angle of the boss 31 and the phase angle of the phase angle detection pattern 17 of the rotating member 15 can be set into a predetermined phase state, using the position adjustment marks 41 and 43. The position adjustment mark 41 and the position adjustment marks 43 constitute a positioning structure (second positioning structure) PD2 for positioning the relative mounting position of the rotating member 15 to the boss 31 about the axis of the boss 31 (motor shaft 14).

The positive Z-direction side face of the boss 31 on which the position adjustment mark 41 is provided is preferably recessed or indented toward the negative Z-direction side from the positive Z-direction side end (surface) of the boss 31 to which the rotating member 15 is attached. Also, and needless to say, when the position adjustment mark 41 of the boss 31 is aligned with one of the multiple position adjustment marks 43 of the rotating member 15, the position adjustment mark 41 can be visually recognized through the position adjustment mark 43, as viewed from the positive Z-direction side.

Here, the reason for providing multiple position adjustment marks 43 on the rotating member 15 is to improve ease of alignment between the boss 31 and the rotating member 15.

Figure 7A:
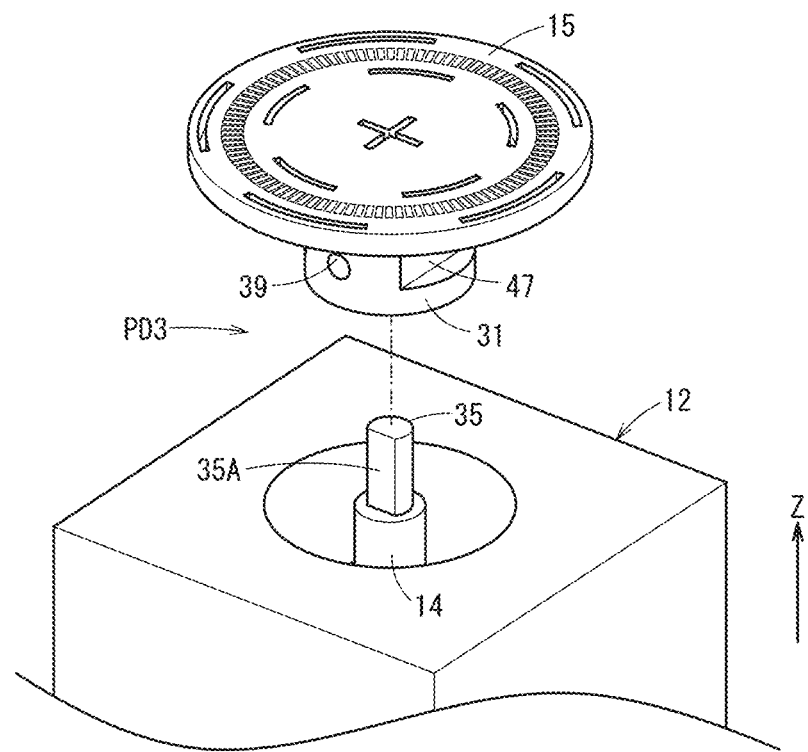
FIGS. 7A and 7B are diagrams for explaining a method of mounting to a motor shaft a rotating member having a boss of the embodiment attached thereto.
Figure 7B:
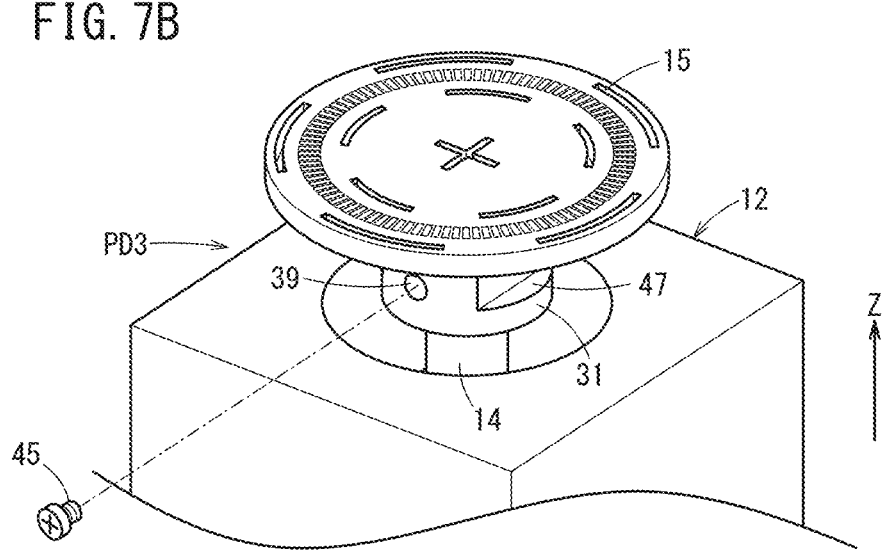

Then, as shown in FIG. 7A, when the rotating member 15 with the boss 31 attached thereto is fixed to the motor shaft 14 mounted to the rotor 26 (see FIG. 1), the cut-out cylindrical portion 35 of the motor shaft 14 is inserted into the boss hole 37 (see FIG. 5) with the cut surface 35A facing toward the screw hole 39. Then, as shown in FIG. 7B, by screwing the screw 45 into the screw hole 39 and tightening it with a predetermined torque, the cut surface 35A can be pressed with a predetermined pressing force by the screw 45. As a result, the motor shaft 14 is prevented from coming off the boss hole 37 and the rotating member 15 is stopped from rotating relative to the motor shaft 14. Thus, the phase between the phase angle of the boss 31 and the phase angle of the motor shaft 14 can be set into a predetermined relationship, and hence the phase angle of the magnets 29 (see FIG. 4) and the phase angle of the pattern formed on the rotating member 15 can be set into a predetermined phase state. Thus, the encoder 10 can detect the phase angle of the magnets 29.

As can be understood from the above description, the cut-out cylindrical portion 35, the boss hole 37 and the screw hole 39 of the boss 31, and the screw 45 constitute a positioning structure (first positioning structure) PD3 for positioning the mounting position of the boss 31 relative to the motor shaft 14 about the axis of the motor shaft 14.

Thus, according to the mounting structure of the rotating member 15 of the present embodiment, the rotating member 15 can be easily attached to the rotating shaft so that the phase between the phase angle of the magnets 29 and the phase angle of the phase angle detection pattern 17 formed on the rotating member 15 can be set in a predetermined state.

The work of mounting the motor shaft 14 to the rotor 26, the work of mounting the rotating member 15 to the boss 31, the work of mounting the boss 31 with the rotating member 15 attached thereto to the motor shaft 14 mounted to the rotor 26, and other works may be performed by an operator (person) or by a robot.

[Modifications]

The mounting structure of the rotating member 15 of the encoder 10 and the mounting method of the rotating member 15 of the encoder 10 described in the above embodiment can be modified as follows.

(Modification 1)

In the above embodiment, the boss hole 37 has a cylindrical shape, but the hole shape is not limited to this. For example, the boss hole 37 may have a shape into which the shape of the cut-out cylindrical portion 35 can be fitted. In this case, the phase angle of the boss 31 and the phase angle of the motor shaft 14 can be set in a predetermined phase state by only inserting (fitting) the cut-out cylindrical portion 35 into the boss hole 37. For this, the screw hole 39 and the screw 45 become unnecessary. In this case, the cut-out cylindrical portion 35 and the boss hole 37 formed in the boss 31 forms a positioning structure PD3 for positioning the mounting position of the boss 31 relative to the motor shaft 14 about the axis of the motor shaft 14. Also in this case, in order to prevent the motor shaft 14 from coming off from the boss hole 37, it is preferable to bond the cut-out cylindrical portion 35 and the boss 31 to each other with an adhesive.

(Modification 2)

In the above embodiment, the rotation angle of the motor shaft 14 and the phase angle of the magnets 29 are detected using light transmitted through the rotating member 15. However, light reflected on the rotating member 15 may be used to detect the rotation angle of the motor shaft 14 and the phase angle of the magnets 29.

(Modification 3)

In the above embodiment, the keys 32 are formed on the rotor 26 while the key slots 34 are formed on the motor shaft 14. However, the key slots 34 may be formed on the rotor 26 while the keys 32 may be formed on the motor shaft 14.

(Modification 4)

Modifications 1 to 3 may be arbitrarily combined as long as no technical inconsistency occurs.

[Inventions that can be Grasped from the Embodiment and Modifications 1 to 4]

<First Invention>

The first invention resides in the mounting structure of the rotating member (15) of the encoder (10) for detecting a phase angle of a magnet (29) provided on a rotor (26) of a motor (12), including: a rotating shaft (14) configured to be rotated by driving of the motor (12); the rotating member (15) on which a phase angle detection pattern (17) configured to detect the phase angle is formed; and a boss (31) attached to the rotating member (15) and configured to mount the rotating member (15) to an end of the rotating shaft (14). In this configuration, the end of the rotating shaft (14) and the boss (31) are provided with a first positioning structure (PD3) configured to position the mounting position of the boss (31) relative to the rotating shaft (14) about the axis of the rotating shaft (14).

Thus, the rotating member (15) of the encoder (10) can be easily attached to the rotating shaft (14) so that the phase angle of the magnet (29) and the phase angle of the phase angle detection pattern (17) formed on the rotating member (15) are set in a predetermined phase state.

The first positioning structure (PD3) may include: a cut-out cylindrical portion (35) formed at the end of the rotating shaft (14) so as to have a cut surface (35A) formed by cutting a cylindrical member along a plane parallel to the rotating shaft; a boss hole (37) formed in the boss (31), the cut-out cylindrical portion (35) being inserted into the boss hole; and a screw hole (39) formed in the boss (31) and extending from the outer peripheral surface of the boss (31) to the boss hole (37) so as to communicate with boss hole. Thus, the rotating member (15) of the encoder (10) can be easily attached to the rotating shaft (14) so that the phase angle of the magnet (29) and the phase angle of the phase angle detection pattern (17) formed on the rotating member (15) are set in a predetermined phase state.

The boss (31) and the rotating member (15) may be provided with a second positioning structure (PD2) configured to position the mounting position of the rotating member (15) relative to the boss (31), about the axis of the rotating shaft (14). The boss (31) and the rotating member (15) may be positioned by the second positioning structure (PD2). Thereby, the rotating member (15) can be easily attached to the boss (31) so that the phase between the phase angle of the boss (31) and the phase angle of phase angle detection pattern (17) on the rotating member (15) can be set in a predetermined state. Therefore, the rotating member (15) of the encoder (10) can be easily attached to the rotating shaft (14) so that the phase angle of the magnet (29) and the phase angle of the phase angle detection pattern (17) formed on the rotating member (15) are set in a predetermined phase state.

The second positioning structure (PD2) may include position adjustment marks (41, 43) provided on the boss (31) and the rotating member (15), respectively. The rotating member (15) may be attached to the boss (31) so that the position adjustment mark (41) of the boss (31) and the position adjustment mark (43) of the rotating member (15) are aligned with each other. Thereby, the rotating member (15) can be easily attached to the boss (31) so that the phase between the phase angle of the boss (31) and the phase angle of the phase angle detection pattern (17) on the rotating member (15) can be set in a predetermined state. Therefore, the rotating member (15) of the encoder (10) can be easily attached to the rotating shaft (14) so that the phase angle of the magnet (29) and the phase angle of the phase angle detection pattern (17) formed on the rotating member (15) are set in a predetermined phase state.

The gripping groove (47) configured to allow a robot to grip and hold the boss (31) is formed on the outer peripheral surface of the boss (31). This makes it easy for the robot to grip the boss (31), resulting in improved working efficiency.

<Second Invention>

The second invention resides in a method of mounting a rotating member (15) of an encoder (10) for detecting a phase angle of a magnet (29) provided on a rotor (26) of a motor (12). The encoder (10) includes the rotating member (15) on which a phase angle detection pattern (17) for detecting the phase angle is formed, and a boss (31) attached to the rotating member (15) and configured to mount the rotating member (15) to an end of the rotating shaft (14) that is rotated by driving of the motor (12). The rotating shaft (14) includes, formed at the end, a cut-out cylindrical portion (35) having a cut surface (35A) formed by cutting a cylindrical member along a plane parallel to the rotating shaft (14). The boss (31) includes a boss hole (37) into which the cut-out cylindrical portion (35) is inserted, and a screw hole (39) extending from the outer peripheral surface of the boss (31) to the boss hole (37) so as to communicate with the boss hole. The method includes a step of inserting the cut-out cylindrical portion (35) into the boss hole (37), and a step of fixing the rotating member (15) to the rotating shaft (14) by screwing a screw (45) into the screw hole (39) so as to press the cut surface (35A) with the screw (45).

Thus, the rotating member (15) of the encoder (10) can be easily attached to the rotating shaft (14) so that the phase angle of the magnet (29) and the phase angle of the phase angle detection pattern (17) formed on the rotating member (15) are set in a predetermined phase state.

It is preferable that the boss (31) and the rotating member (15) are each provided with a position adjustment mark (41, 43) for positioning the mounting position of the rotating member (15) relative to the boss (31), about the axis of the rotating shaft (14), and the method further includes a step of attaching the rotating member (15) to the boss (31) by aligning the position adjustment mark (41) of the boss and the position adjustment mark (43) of the rotating member (15) with each other. Thereby, the rotating member (15) can be easily attached to the boss (31) so that the phase between the phase angle of the boss (31) and the phase angle of the phase angle detection pattern (17) on the rotating member (15) can be set in a predetermined state. Therefore, the rotating member (15) of the encoder (10) can be easily attached to the rotating shaft (14) so that the phase angle of the magnet (29) and the phase angle of the phase angle detection pattern (17) formed on the rotating member (15) are set in a predetermined phase state.

The present invention is not particularly limited to the embodiment described above, and various modifications are possible without departing from the essence and gist of the present invention.

What is claimed is:

1. A mounting structure of a rotating member of an encoder for detecting a phase angle of a magnet provided on a rotor of a motor, comprising:

a rotating shaft configured to be rotated by driving of the motor;

the rotating member on which a phase angle detection pattern configured to detect the phase angle is formed; and a boss attached to the rotating member and configured to mount the rotating member to an end of the rotating shaft, wherein the end of the rotating shaft and the boss are provided with a first positioning structure configured to position a mounting position of the boss relative to the rotating shaft about an axis of the rotating shaft, wherein the first positioning structure includes:

a cut-out cylindrical portion formed at the end of the rotating shaft so as to have a cut surface formed by cutting a cylindrical member along a plane parallel to the rotating shaft;

a boss hole formed in the boss, the cut-out cylindrical portion being inserted into the boss hole;

a screw hole formed in the boss and extending from an outer peripheral surface of the boss to the boss hole so as to communicate with the boss hole; and a screw screwed into the screw hole and pressing the cut surface.

2. The mounting structure of the rotating member of the encoder according to claim 1, wherein:

the boss and the rotating member are provided with a second positioning structure configured to position a mounting position of the rotating member relative to the boss, about the axis of the rotating shaft; and the boss and the rotating member are positioned by the second positioning structure.

3. The mounting structure of the rotating member of the encoder according to claim 2, wherein:

the second positioning structure comprises position adjustment marks provided on the boss and the rotating member, respectively; and the rotating member is attached to the boss so that the position adjustment mark of the boss and the position adjustment mark of the rotating member are aligned with each other.

4. The mounting structure of the rotating member of the encoder according to claim 1, wherein a gripping groove configured to allow a robot to grip and hold the boss is formed on an outer peripheral surface of the boss.

5. A method of mounting a rotating member of an encoder for detecting a phase angle of a magnet provided on a rotor of a motor, wherein: the encoder includes the rotating member on which a phase angle detection pattern configured to detect the phase angle is formed, and a boss attached to the rotating member and configured to mount the rotating member to an end of a rotating shaft that is rotated by driving of the motor; the rotating shaft includes, formed at an end thereof, a cut-out cylindrical portion having a cut surface formed by cutting a cylindrical member along a plane parallel to the rotating shaft; and the boss includes a boss hole into which the cut-out cylindrical portion is inserted, and a screw hole extending from an outer peripheral surface of the boss to the boss hole so as to communicate with the boss hole, the method comprising:

a step of inserting the cut-out cylindrical portion into the boss hole; and a step of fixing the rotating member to the rotating shaft by screwing a screw into the screw hole so as to press the cut surface with the screw.

6. The method of mounting the rotating member of the encoder according to claim 5, wherein the boss and the rotating member are each provided with a position adjustment mark configured to position a mounting position of the rotating member relative to the boss, about an axis of the rotating shaft, the method further comprising a step of attaching the rotating member to the boss by aligning the position adjustment mark of the boss and the position adjustment mark of the rotating member with each other.

* * * * *